(12) United States Patent
Inoue

(10) Patent No.: US 6,958,029 B2
(45) Date of Patent: Oct. 25, 2005

(54) CONTINUOUSLY VARIABLE TRANSMISSION APPARATUS

(75) Inventor: Eiji Inoue, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/721,274

(22) Filed: Nov. 26, 2003

(65) Prior Publication Data

US 2004/0142785 A1 Jul. 22, 2004

(30) Foreign Application Priority Data

Nov. 28, 2002 (JP) .................................. P. 2002-344837

(51) Int. Cl.⁷ .............................................. F16H 37/02
(52) U.S. Cl. ..................... 475/215; 475/211; 475/214; 475/216; 475/217; 475/218; 475/219; 475/329; 475/330
(58) Field of Search ................................ 475/216, 215, 475/218, 219, 211, 214, 217, 329, 330

(56) References Cited

U.S. PATENT DOCUMENTS

| | | | | |
|---|---|---|---|---|
| 4,856,371 A | * | 8/1989 | Kemper ...................... 475/215 |
| 5,129,867 A | * | 7/1992 | Fredriksen et al. ........... 475/79 |
| 5,277,670 A | * | 1/1994 | Tenberge ..................... 475/81 |
| 5,453,061 A | | 9/1995 | Fellows | |
| 6,059,685 A | * | 5/2000 | Hoge et al. ................. 475/214 |
| 6,171,210 B1 | * | 1/2001 | Miyata et al. .............. 475/216 |
| 6,217,473 B1 | | 4/2001 | Ueda et al. | |
| 6,251,038 B1 | | 6/2001 | Ishikawa et al. | |
| 6,251,039 B1 | | 6/2001 | Koga | |
| 6,358,178 B1 | * | 3/2002 | Wittkopp ..................... 475/207 |
| 6,719,659 B2 | * | 4/2004 | Geiberger et al. .......... 475/216 |
| 2003/0060318 A1 | | 3/2003 | Sumi | |

FOREIGN PATENT DOCUMENTS

| | | |
|---|---|---|
| JP | 1-169169 A | 7/1989 |
| JP | 9-210175 A | 8/1997 |
| JP | 9-210191 A | 8/1997 |
| JP | 2778038 B2 | 5/1998 |

* cited by examiner

*Primary Examiner*—Rodney H. Bonck
*Assistant Examiner*—David D. Le
(74) *Attorney, Agent, or Firm*—Sughrue Mion, PLLC

(57) ABSTRACT

A continuously variable transmission apparatus, has: an input shaft; a toroidal-type continuously variable transmission; a first rotation transmission shaft; a first planetary-gear-type transmission; a second planetary-gear-type transmission; a second rotation transmission shaft; an output shaft; a first power transmission mechanism; a second power transmission mechanism; and a switching mechanism, wherein, in a state where the power transmission through the first power transmission mechanism is allowed and the power transmission through the second power transmission mechanism is cut off, in accordance with the control of the transmission ratio of the toroidal-type continuously variable transmission, the output shaft be stopped while leaving the input shaft rotating.

6 Claims, 5 Drawing Sheets

CONTINUOUSLY VARIABLE TRANSMISSION APPARATUS

BACKGROUND OF THE INVENTION

1. Technical field of the Invention

The present invention relates to an improvement in a continuously variable transmission apparatus incorporating therein a toroidal-type continuously variable transmission for use as an automatic transmission apparatus for a car.

2. Description of the Related Art

As an automatic transmission apparatus for a car, use of such a toroidal-type continuously variable transmission as shown in FIG. 4 has been studied and enforced in part of the car industry. This is referred to as a toroidal-type continuously variable transmission of a double-cavity type, in which, on the peripheries of the two end portions of an input shaft 1, there are supported two input side disks 2, 2 through their associated ball splines 3, 3. Therefore, the two input side disks 2, 2 are respectively supported so as to be concentric with each other and can be rotated in synchronization with each other. Also, on the periphery of the middle portion of the input shaft 1, there is supported an output gear 4 in such a manner that it can be rotated with respect to the input shaft 1. And, two output side disks 5, 5 are respectively spline engaged with the two end portions of a cylindrical portion 9 disposed on the central portion of the output gear 4. Therefore, the two output side disks 5, 5 can be rotated in synchronization with the output gear 4.

Also, between the two sets of the input side disks 2, 2 and output side disks 5, 5, there are held power rollers 6, 6 by two or more (usually, two or three) in number in each set. These power rollers 6, 6 are rotatably supported on the inner surfaces of their associated trunnions 7, 7 through their associated support shafts 8, 8 and a plurality of rolling bearings. Each of these trunnions 7, 7 can be swung and shifted about a pair of pivot shafts which are disposed on the longitudinal-direction (in FIG. 4, vertical-direction) two end portions of its associated trunnion in such a manner that the two pivot shafts are concentric with each other.

To operate the above-structured toroidal-type continuously variable transmission, using a drive shaft 10 connected to a power source such as an engine, one (in FIG. 4, the left-side) of the input-side disks 2 may be driven and rotated through such a pressing device 11 of a loading cam type as shown in FIG. 4 or an oil pressure type. As a result of this, the pair of input side disks 2, 2 supported on the two end portions of the input shaft 1 are rotated in synchronization with each other while they are being pushed in their mutually approaching directions. And, the rotation power of the two input side disks is transmitted to the output side disks 5, 5 through the power rollers 6, 6 and is then taken out from the output gear 4.

Let us discuss a case in which the rotation speed between the input shaft 1 and output gear 4 is to be changed. Firstly, to reduce the rotation speed between the input shaft 1 and output gear 4, the trunnions 7, 7 may be respectively swung to such positions as shown in FIG. 4. And, the peripheral surfaces of the power rollers 6, 6 are, as shown in FIG. 4, contacted with the near-to-center portions of the inner surfaces of the two input side disks 2, 2 and the near-to-outer-peripheral portions of the inner surfaces of the output disks 5, 5, respectively. On the other hand, to increase the rotation speed between the input shaft 1 and output gear 4, the trunnions 7, 7 may be respectively swung in the opposite directions to the directions shown in FIG. 4; and, the trunnions 7, 7 may be then inclined in such a manner the peripheral surfaces of the power rollers 6, 6, oppositely to the states shown in FIG. 4, can be contacted with the near-to-outer-peripheral portions of the inner surfaces of the two input side disks 2, 2 and the near-to-center portions of the inner surfaces of the output disks 5, 5, respectively. By the way, in case where the inclination angles of the trunnions 7,7 are set in the intermediate angles between the rotation speed reducing and increasing angles, there can be obtained an intermediate transmission ratio (speed ratio) between the input shaft 1 and output gear 4.

Further, conventionally, when incorporating the above-structured and operatable into a continuously variable transmission for an actual car, there have been proposed various structures in which the toroidal-type continuously variable transmission is combined with a planetary gear mechanism to thereby provide a continuously variable transmission apparatus for a car, for example, structures as disclosed in U.S. Pat. No. 6,251,039 and JP 2778038. FIG. 5 shows, of the conventionally proposed continuously variable transmission apparatus, a continuously variable transmission apparatus disclosed in U.S. Pat. No. 6,251,039. This continuously variable transmission apparatus is composed of a combination of a toroidal-type continuously variable transmission 12 and a planetary-gear-type transmission 13. Of these transmissions, the toroidal-type continuously variable transmission 12 comprises an input shaft 1, a pair of input side disks 2, 2, an output side disk 5a, and a plurality of power rollers 6, 6. In the illustrated embodiment, the output side disk 5a has a structure in which the outer surfaces of a pair of output side disks are butted against each other to thereby form the two output side disks into an integral body.

Also, the planetary-gear-type transmission 13 includes a carrier 14 which is connected and fixed to the input shaft 1 and one (in FIG. 5, the right-side input side disk) of the two input side disks 2. And, on the diameter-direction intermediate portion of the carrier 14, there is rotatably supported a first transmission shaft 16 to the two end portions of which there are fixed two planetary gear elements 15a, 15b respectively. Also, a second transmission shaft 18, to the two end portions of which there are fixed two sun gears 17a, 17b respectively, is supported on the opposite side to the input shaft 1 with the carrier 14 between them in such a manner that it is concentric with the input shaft 1 and it can be rotated. And, the planetary gear elements 15a, 15b are respectively meshingly engaged with a sun gear 20 fixed to the leading end portion (in FIG. 5, the right end portion) of a hollow rotary shaft 19 having its base end portion connected to the output side disk 5a, or the sun gear 17a fixed to one end portion (in FIG. 5, the left end portion) of the second transmission shaft 18. Also, one (in FIG. 5, the left side) planetary gear element 15a is meshingly engaged, through another planetary gear element 21, with a ring gear 22 which is rotatably disposed on the periphery of the carrier 14.

On the other hand, another planetary gear elements 24a, 24b are rotatably supported on a second carrier 23 which is disposed on the periphery of the sun gear 17b fixed to the other end portion (in FIG. 5, the right end portion) of the second transmission shaft 18. By the way, the second carrier 23 is connected to the base end portion (in FIG. 5, the left end portion) of an output shaft 25 which is disposed concentrically with the input shaft 1 and second transmission shaft 18. Also, the planetary gear elements 24a, 24b are meshingly engaged with each other; and, one planetary gear element 24a is meshingly engaged with the sun gear 17b, whereas the other planetary gear element 24b is meshingly engaged with a second ring gear 26 which is rotatably disposed on the periphery of the second carrier 23. Further, the ring gear 22 and second carrier 23 can be engaged with and disengaged from each other by a low-speed clutch 27, while the second ring gear 26 and the fixed part of the continuously variable transmission apparatus such as a housing can be engaged with and disengaged from each other by a high-speed clutch 28.

In the case of the continuously variable transmission apparatus shown in FIG. 5, in a so called low speed mode state in which the low-speed clutch 27 is connected and the connection of the high-speed clutch 28 is cut off, the power of the input shaft 1 is transmitted through the ring gear 22 to the output shaft 25. And, by changing the transmission ratio of the toroidal-type continuously variable transmission 12, the transmission ratio of the whole of the continuously variable transmission apparatus, that is, the transmission ratio between the input shaft 1 and output shaft 25 can be changed. In such low speed mode state, the transmission ratio of the whole of the continuously variable transmission apparatus can be changed infinitely. That is, by controlling the transmission ratio of the toroidal-type continuously variable transmission 12, while the input shaft 1 is left rotating, the rotation state of the output shaft 25 can be changed between the forward and reversed rotation states thereof with a stop state between them.

By the way, during speed increasing operation in the above low speed mode state or during the constant speed running operation of a car, the torque passing through the toroidal-type continuously variable transmission 12 is transmitted from the input shaft 1 through the carrier 26, first transmission shaft 16, sun gear 20 and hollow rotation shaft 19 to the output side disk 5a, and is further applied from the outside disk 5a through the respective power rollers 6, 6 to the input side disks 2, 2. That is, the torque passing through the toroidal-type continuously variable transmission 12 during the speed accelerating or constant speed running operation circulate in a direction where the input side disks 2, 2 receive the torque from the power rollers 6, 6 respectively.

On the other hand, in a so called high speed mode state where the connection of the low-speed clutch 27 is cut off and the high-speed clutch 28 is connected, the power of the input shaft 1 is transmitted through the first and second transmission shafts 16, 18 to the output shaft 25. And, by changing the transmission ratio of the toroidal-type continuously variable transmission 12, the transmission ratio of the whole of the continuously variable transmission apparatus can be changed. In this case, as the transmission ratio of the toroidal-type continuously variable transmission 12 is increased, the transmission ratio of the whole of the continuously variable transmission apparatus can be increased.

By the way, during the speed increasing operation in such high speed mode state or constant speed running operation, the torque passing through the toroidal-type continuously variable transmission 12 is applied in a direction where the input side disks 2, 2 apply the torque to the power rollers 6, 6.

Although not shown, in JP 2,778,038, there is disclosed a continuously variable transmission apparatus structured such that a toroidal-type continuously variable transmission, two sets of planetary-gear-type transmissions, and four sets of clutches are combined together. According to such continuously variable transmission apparatus as disclosed in JP-2,778,038, by controlling the connection and disconnection of the four sets of clutches, there can be realized three kinds of modes on the advancing side and one kind of mode on the retreating side. And, not only the width of the transmission ratio on the advancing side can be increased but also, in the high-speed side two kinds of modes to be realized on the advancing side, the power passing through the toroidal-type continuously variable transmission can be controlled down to a low level, thereby being able to enhance the transmission efficiency of the whole of continuously variable transmission apparatus.

In the case of the conventionally proposed continuously variable transmission apparatus having the above structure, since the toroidal-type continuously variable transmission and planetary-gear-type transmission are disposed coaxially with each other, the whole of continuously variable transmission apparatus is large in the-axial-direction dimension thereof. For this reason, the present conventional continuously variable transmission apparatus is not fit for a transmission to be used in a front engine front drive car (FF car) which has come into wide use mainly in the field of a small-sized car. In the case of the present invention disclosed in JP-2778038, there is incorporated therein a so called single-cavity-type toroidal-type continuously variable transmission including an input side disk and an output side disk, the axial-direction dimension of this toroidal-type continuously variable transmission itself is short. However, as known widely, the single-cavity-type toroidal-type continuously variable transmission is poorer in the transmission efficiency than the double-cavity-type toroidal-type continuously variable transmissions respectively shown in FIGS. 4 and 5. When structuring a continously variable transmission apparatus actually, as a toroidal-type continuously variable transmission, there is often used a double-cavity-type toroidal-type continuously variable transmission. However, in this case, as described above, an increase in the axial-direction dimension thereof is unavoidable.

Further, in the case of the structure disclosed in JP-2778038, since an infinite transmission ratio cannot be realized, in addition to the four sets of clutches, there is further necessary a start mechanism such as a torque converter or an electromagnetic clutch. Due to this, the continuously variable transmission apparatus becomes fairly large in size as a whole, which makes it considerably difficult to use the present continuously variable transmission apparatus as a transmission for an FF car.

SUMMARY OF THE INVENTION

In view of the above-mentioned related structures, it is an object of the present invention to provide a structure which not only can reduce the axial-direction dimension thereof but also can realize an infinite transmission ratio.

In attaining the above object, according to a first aspect of the present invention, there is provided a continuously variable transmission apparatus, having: an input shaft; a toroidal-type continuously variable transmission disposed concentrically with the input shaft; a first rotation transmission shaft disposed in parallel to the input shaft; a first planetary-gear-type transmission disposed on the periphery of the first rotation transmission shaft so as to be concentric with each other, the first planetary-gear-type transmission including a first ring gear; a second planetary-gear-type transmission disposed on the periphery of the first rotation transmission shaft so as to be concentric with each other, the second rotation transmission shaft including a second carrier; a second rotation transmission shaft disposed in parallel to the input shaft and the first rotation transmission shaft; an output shaft disposed concentrically with the first rotation transmission shaft; a first power transmission mechanism for transmitting the rotation of the input shaft to the first ring gear of the first planetary-gear-type transmission; a second power transmission mechanism for transmitting the rotation of the input shaft through the second rotation transmission shaft to the second carrier of the second planetary-gear-type transmission; and, a switching mechanism for switching power transmission states between the input shaft and the output shaft through the first and second power transmission mechanisms over to each other, wherein, in a state where the power transmission through the first power transmission mechanism is allowed and the power transmission through the second power transmission mechanism is cut off, in accordance with the control of the transmission ratio of the toroidal-type continuously variable transmission, the output shaft be stopped while leaving the input shaft rotating.

According to a second aspect of the present invention, there is provided a continuously variable transmission apparatus as set forth in the first aspect, wherein the first and second planetary-gear-type transmissions are respectively of a single pinion type, the toroidal-type continuously variable transmission has; an input side disk rotatable together with the input shaft; an output side disk supported so as to be concentric with the input side disk and rotated with respect to the input side disk; a plurality of power rollers respectively interposed between the input side disk and the output side disk; and a third power transmission mechanism for allowing the output side disk to drive and rotate the first rotation transmission shaft, the first planetary-gear-type transmission has; a first sun gear rotatable together with the first rotation transmission shaft; a first ring gear rotatably supported on the periphery of the first sun gear; a first carrier supported so as to be concentric with the first sun gear and the first ring gear and can be rotated with respect to the first sun gear and the first ring gear; and, a plurality of first planetary gears meshingly engaged with the first sun gear and the first ring gear while they are respectively rotatably supported on the first carrier, the second planetary-gear-type transmission has: a second sun gear rotatable together with the first rotation transmission shaft; a second ring gear rotatably supported on the periphery of the second sun gear and rotatable together with the first carrier; a second carrier supported so as to be concentric with the second sun gear and the second ring gear and rotated with respect to the second sun gear and the second ring gear; and, a plurality of second planetary gears meshingly engaged with the second sun gear and the second ring gear while they are respectively rotatably supported on the second carrier, and the first power transmission mechanism is used to transmit the rotation of the input shaft to the first ring gear, the second power transmission mechanism is used to transmit the rotation of the input shaft through the second rotation transmission shaft to the second carrier, and the switching mechanism allows execution of the power transmission through one of the first and second power transmission mechanisms and cuts off the power transmission through the other power transmission mechanism, in a state where the switching mechanism allows execution of the power transmission through the first power transmission mechanism and cuts off the power transmission through the second power transmission mechanism, in accordance with the control of the transmission ratio of the toroidal-type continuously variable transmission, the output shaft is stopped while leaving the input shaft rotating.

According to a third aspect of the present invention, there is provided a continuously variable transmission apparatus as set forth in the second aspect, wherein, in case where the reduction ratio of the first power transmission mechanism from the input shaft to the first ring gear is expressed as $R_{IPG}$, the reduction ratio of the third power transmission mechanism from the output side disk to the first sun gear is expressed as $R_{OPG}$, and the ratio of the teeth number of the first ring gear with respect to that of the first sun gear is expressed as $i_1$, $(R_{OPG}/R_{IPG})\cdot i_1$ is the transmission ratio that is realized by the toroidal-type continuously variable transmission.

According to a fourth aspect of the present invention, there is provided a continuously variable transmission apparatus as set forth in the third aspect, wherein there is satisfied the relationship, that is, $0.4<(R_{OPG}/R_{IPG})\cdot i_1<2.5$.

According to a fifth aspect of the present invention, there is provided a continuously variable transmission apparatus as set forth in the third aspect, wherein the reduction ratio of the second power transmission mechanism from the input shaft to the second carrier is larger than the reduction ratio of the first power transmission mechanism from the input shaft to the first ring gear.

According to a sixth aspect of the present invention, there is provided a continuously variable transmission apparatus as set forth in the second aspect, wherein the switching mechanism have a low-speed clutch to be connected when realizing a low speed mode for stopping the output shaft while the input shaft is left rotating, and a high-speed clutch to be connected when realizing a high speed mode usable only in the advancing state; and also wherein the low-speed clutch is disposed in series in the intermediate portion of the first power transmission mechanism, and the high-speed clutch is disposed in series in the intermediate portion of the second power transmission mechanism.

According to the above-structured continuously variable transmission apparatus, since the center axis of the toroidal-type continuously variable transmission is shifted from the center axes of the first and second planetary-gear-type transmissions, the axial-direction dimension of the whole of the continuously variable transmission apparatus can be shortened. Also, because it is possible to realize an infinite transmission ratio state in which the output shaft can be stopped while leaving the input shaft rotating, there can be eliminated the need to incorporate therein a start device such as a torque converter separately. Further, the number of clutches constituting the switching mechanism for mode switching can be reduced. This makes it possible to realize a continuously variable transmission apparatus which is small in size and excellent in transmission efficiency.

DETAILED DESCRIPTION OF THE PREFERRED EMBODIMENTS

Figure 1:
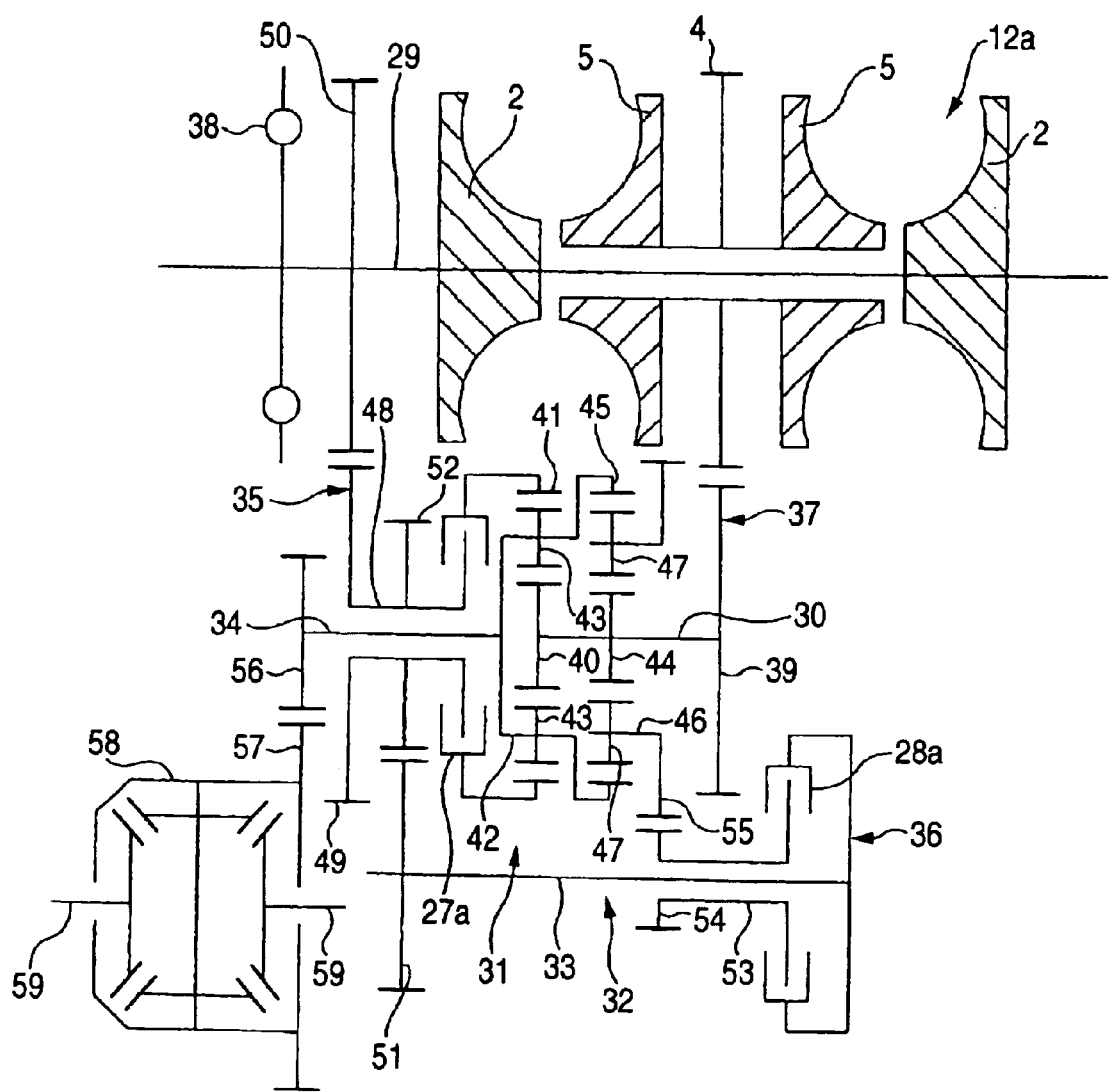
FIG. 1 is a schematic section view of an embodiment of continuously variable transmission apparatus according to the present invention.

FIG. 1 shows an embodiment of a continuously variable transmission apparatus according to the present invention. The continuously variable transmission apparatus according to the present embodiment comprises an input shaft 29, a toroidal-type continuously variable transmission 12a, a first rotation transmission shaft 30, first and second planetary-gear-type transmissions 31, 32, a second rotation transmission shaft 33, an output shaft 34, first to third power transmission mechanisms 35 to 37, and a low-speed clutch 27a and a high-speed clutch 28a cooperating together in constituting a switching mechanism of these composing parts, the input shaft 29 is connected through a damper joint 38 to the crankshaft of an engine, while the input shaft 29 can be driven and rotated by the engine.

Figure 4:
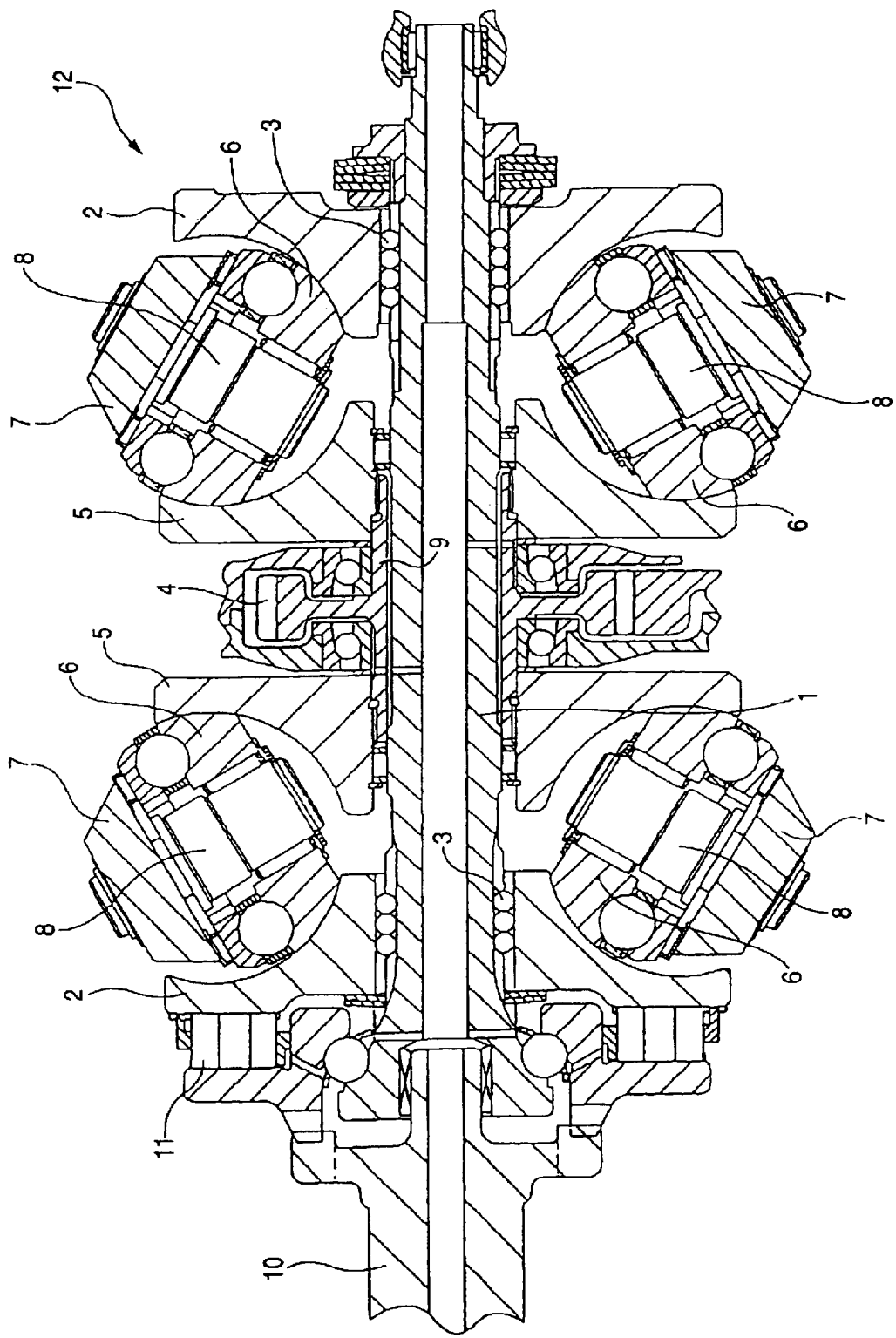
FIG. 4 is a section view of an example of a conventionally known toroidal-type continuously variable transmission therein; and, FIG. 5 is a schematic section view of an example of a conventionally known continuously variable transmission apparatus.
Figure 5:
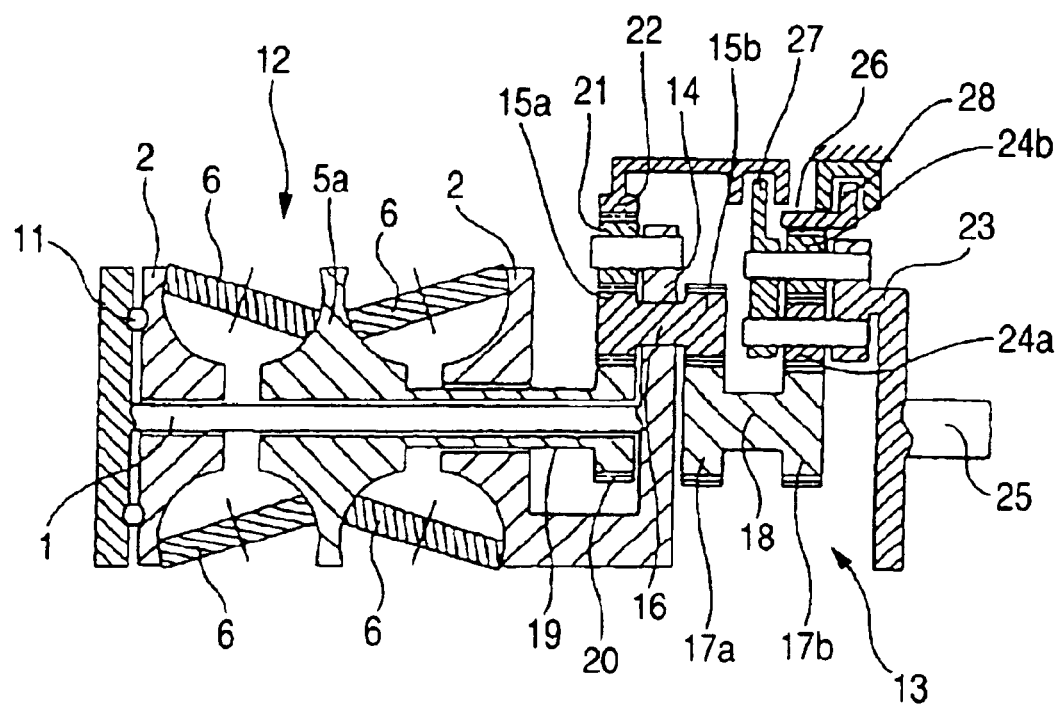

The toroidal-type continuously variable transmission 12a is similar in structure to the conventional structure shown in the above-discussed FIG. 4 and includes a pair of input side disks 2, 2 which can be rotated together with the input shaft 29. On the periphery of the middle portion of the input shaft 29, there are supported a pair of output side disks 5, 5 so as to be concentric with the two input side disks 2, 2 and can be rotated with respect to the two input side disks 2, 2. And, between the two sets of two input side disks 2, 2 and two output side disks 5, 5, there are interposed and held a plurality of power rollers 6, 6 (see FIGS. 4 and 5) in each set. Also, between the two output side disks 5, 5, there is interposed an output gear 4, so that the rotation power of the two output side disks 5, 5 can taken out by the output gear 4. The structure of the toroidal-type continuously variable transmission 12a as well as the operation for controlling the transmission ratio between the input shaft 29 and output gear 4 are respectively similar to those of the conventionally widely known toroidal-type continuously variable transmission.

Also, the first rotation transmission shaft 30 is disposed such that it extends in parallel to the input shaft 29. And, a gear 39 fixed to one end (in FIG. 1, the right end) of the first rotation transmission shaft 30 is meshingly engaged with the output gear 4 to thereby constitute the third power transmission mechanism 37. The reduction ratio of the third power transmission mechanism 37 is expressed as $R_{OPG}$. Therefore, as the two output side disks 5, 5 rotate, the first rotation transmission shaft 30 rotates in the opposite direction to the two output disks 5, 5 at a speed corresponding to the reduction ratio $R_{OPG}$. On the periphery of the thus-structured first rotation transmission shaft 30, there are disposed the first and second planetary-gear-type transmissions 31, 32 in such a manner that the first and second planetary-gear-type transmissions 31, 32 are concentric with each other. These two first and second planetary-gear-type transmissions 31, 32 respectively have a single-pinion-type structure (in which the same planetary gear can be meshingly engaged with both of a sun gear and a ring gear).

In order to constitute the first planetary-gear-type transmission 31 of the first and second planetary-gear-type transmissions 31, 32, a first sun gear 40 is disposed on the other end portion (in FIG. 1, the left end portion) of the first rotation transmission shaft 30 in such a manner that it can be rotated together with the first rotation transmission shaft 30. On the periphery of the first sun gear 40, there is rotatably supported a first ring gear 41. Also, a first carrier 42 is supported in such a manner that not only it is concentric with the first sun gear 40 and first ring gear 41 but also it can be rotated with respect to these two gears 40, 41. And, a plurality of (generally, three or four) first planetary gears 43, 43, which are rotatably supported on the first carrier 42, are respectively meshingly engaged with the first sun gear 40 and first ring gear 41.

The thus-structured first ring gear 41, which constitutes the first planetary-gear-type transmission 31, is connected with the input shaft 29 through the first power transmission mechanism 35 in such a manner that they can transmit their rotations to each other. In the case of the illustrated embodiment, in order to constitute the first power transmission mechanism 35, a hollow rotation shaft 48 is disposed on the periphery of the middle portion of the output shaft 34 in such a manner that it can be rotated with respect to the output shaft 34. And, a gear 49 fixed to one end portion (in FIG. 1, the left end portion) of the hollow rotation shaft 48 is meshingly engaged with a gear 50 which is fixed to the input shaft 29. Also, the other end portion (in FIG. 1, the left end portion) of the hollow rotation shaft 48 can be engaged with and removed from the first ring gear 41 through the low-speed clutch 27a. The reduction ratio of the thus-structured first power transmission mechanism 35 is expressed as $R_{IPG}$. Therefore, in a state where the low-speed clutch 27a is connected, as the input shaft 29 rotates, the first ring gear 41 can be rotated in the opposite direction to the input shaft 29 at a speed corresponding to the reduction ratio $R_{IPG}$.

On the other hand, in order to constitute the second planetary-gear-type transmission 32, on the middle portion of the first-rotation transmission shaft 30, there is disposed a second sun gear 44 in such a manner that it can be rotated together with the first rotation transmission shaft 30. On the periphery of the second sun gear 44, there is rotatably supported a second ring gear 45. The second ring gear 45 is connected with the first carrier 42 constituting the first planetary-gear-type transmission 31 in such a manner that it can be rotated together with the first carrier 42. Also, the second carrier 46 is supported in such a manner that not only it is concentric with the second sun gear 44 and second ring gear 45 but also it can be rotated with respect to these two gears 44, 45. And, a plurality of second planetary gears 47, 47, which are rotatably supported on the second carrier 46, are respectively meshingly engaged with the second sun gear 44 and second ring gear 45.

Also, the second rotation transmission shaft 33 is used to constitute the second power transmission mechanism 36 and is disposed in parallel to the input shaft 29 and first rotation transmission shaft 30. A gear 51 fixed to one end (in FIG. 1, the left end) of the thus-structured second rotation transmission shaft 33 is meshingly engaged with a gear 52 which is fixed to the middle portion of the hollow rotation shaft 48. The reduction ratio of a transmission part constituted by these two gears 51, 52 is expressed as $R_{CG1}$. Also, on the periphery of the middle portion of the second rotation transmission shaft 33, there is supported a second hollow rotation shaft 53 so as to be rotatable with respect to the second rotation transmission shaft 33. And, a gear 54 fixed to one end (in FIG. 1, the left end) of the second hollow shaft 33 is meshingly engaged with a gear 55 which is fixed to the second carrier 46. The reduction ratio of a transmission part constituted by these two gears 54, 55 is expressed as $R_{CG2}$. Also, between the other end (in FIG. 1, the right end) of the second hollow rotation shaft 53 and the other end (in FIG. 1, the right end) of the second rotation transmission 33, there is interposed the high-speed clutch 28a. Therefore, in a state where the high-speed clutch 28a is connected, with the rotation of the input shaft 29, the second carrier 46 can be rotated in the opposite direction to the input shaft 29 at a speed corresponding to the product ($R_{IPG} \times R_{CG1} \times R_{CG2}$) of the reduction gear ratio of the respective gear transmission parts.

Further, the leading end portion (in FIG. 1, the left end portion) of the output shaft 34 is connected to a differential gear 58 through two gears 56, 57 which are meshingly engaged with each other. Therefore, when the output shaft 34 is rotated, a pair of right and left axle shafts 59, 59 are driven and rotated in the same direction through the two gears 56, 57 and differential gear 58; and thus, in accordance with the rotation direction of the output shaft 34, the car can be driven.

The operation of the above-structured continuously variable transmission apparatus according to the present embodiment is as follows. Firstly, in the low speed mode state in which the low-speed clutch 27a is connected and the connection of the high-speed clutch 28a is cut off, the rotation power of the input shaft 29 is transmitted through the two following paths ① and ② to the first ring gear 41 and first sun gear 40 which constitute the first planetary-gear-type transmission 31.

① Input shaft 29→gear 50→gear 49→low-speed clutch 27a→first ring gear 41

② Input shaft 29→toroidal-type continuously variable transmission 12a→output gear 4→gear 39→first rotation transmission shaft 30→first sun gear 40.

In this state, a differential component between the first sun gear 40 and first ring gear 41 is taken out through the first carrier 42 as the rotation power of the respective first planetary gears 43, 43 around the first sun gear 40 and first ring gear 41. And, the present rotation power is then taken out from the output shaft 34 connected and fixed to the first carrier 42 through the gears 56, 57 by the differential gear 58, thereby driving and rotating the wheels of the car through the axle shafts 59, 59.

In the case of the above low speed mode state, the speed ratio $e_{CVT}$ of the whole of the continuously variable transmission apparatus can be expressed by the following numeric equation (1).

[Numeric Equation 1]

$$e_{CVT} = \frac{1}{1+i_1}\left(\frac{e_{CVU}}{R_{OPG}} + \frac{i_1}{R_{IPG}}\right) \quad (1)$$

The meanings of marks used in this numeric equation (1) are as follows.

$e_{CVU}$: the transmission ratio of the toroidal-type continuously variable transmission 12a $i_1$: the ratio of the number of the teeth of the first ring gear 41 with respect to that of the first sun gear 40

$R_{OPG}$: the reduction ratio of the third power transmission mechanism 37 constituted by the gear 39 and output gear 4

$R_{IPG}$: the reduction ratio of the first power transmission mechanism 35 constituted by the gear 49 and gear 50.

And, according to such low speed mode state, in case where the transmission ratio $e_{CVU}$ of the toroidal-type continuously variable transmission 12a is set as a value to be expressed by the following numeric equation (2), there can be realized a state of a so called infinite transmission ratio in which the output shaft 34 can be stopped while leaving the input shaft 29 rotating.

[Numeric Equation 2]

$$e_{CVU} = -\frac{R_{OPG}}{R_{IPG}}i_1 \quad (2)$$

Also, by changing the transmission ratio $e_{CVU}$ of the toroidal-type continuously variable transmission 12a to the speed increasing side from the value expressed by the numeric equation (2), the respective axle shafts 59, 59 are rotated in a direction where the car can be backed. And, as the speed increasing ratio increases in value, the rotation speed of the axles in the car backing direction increases. On the other hand, by changing the transmission ratio $e_{CVU}$ of the toroidal-type continuously variable transmission 12a to the speed reducing side from the value expressed by the numeric equation (2), the respective axle shafts 59, 59 are rotated in a direction where the car can be advanced. And, as the speed reducing ratio increases in value, the rotation speed of the axles in the car advancing direction increases. By the way, in case where the absolute value of the right side of the numeric equation (2) is set as the transmission ratio that can be realized by the toroidal-type continuously variable transmission 12a, for example, within the range of 0.4~2.5, an infinite transmission ratio state can be realized in the low speed mode state.

On the other hand, in the high speed mode state in which the connection of the low-speed clutch 27a is cut off and the high-speed clutch 28a is connected, the rotation power of the input shaft 29 is transmitted through the two following paths ③ and ④ to the second carrier 46 and second sun gear 44 which constitute the second planetary-gear-type transmission 32.

③ Input shaft 29→gear 50→gear 49→gear 52→gear 51→second rotation transmission shaft 33→high-speed clutch 28a→second hollow rotation shaft 53→gear 54→gear 55→second carrier 46

④ Input shaft 29→toroidal-type continuously variable transmission 12a→output gear 4→gear 39→first rotation transmission shaft 30→second sun gear 44.

In this state, a differential component between the second sun gear 44 and second carrier 46 is taken out through the first carrier 42 as the rotation power of the second ring ear 45. And, the present rotation power is then taken out from the output shaft 34 connected and fixed to the first carrier 42 through the gears 56, 57 by the differential gear 58, thereby driving and rotating the wheels of the car through the axle shafts 59, 59.

In the case of the above high speed mode state, the speed ratio $e_{CVT}$ of the whole of the continuously variable transmission apparatus can be expressed by the following equation (3).

[Numeric Equation 3]

$$e_{CVT} = \frac{1}{i_2}\left(\frac{1+i_2}{R_{IPG} \cdot R_{CG1} \cdot R_{CG2}} - \frac{e_{CVU}}{R_{OPG}}\right) \quad (4)$$

In the numeric equation (3), the meanings of marks not used in the numeric equation (1) and (2) are as follows.

$i_2$: the ratio of the number of the teeth of the second ring gear 45 with respect to that of the second sun gear 44

$R_{CG1}$: the reduction ratio of the transmission part constituted by the two gears 51, 52

$R_{CG2}$: the reduction ratio of the transmission part constituted by the two gears 54, 55.

As can be clearly seen from the above numeric equation (3), according to the above high speed mode state, in case where the transmission ratio $e_{CVU}$ of the toroidal-type continuously variable transmission 12a is increased toward the speed increasing side, the transmission ratio $e_{CVT}$ of the whole of the continuously variable transmission apparatus is also varied toward the speed increasing side.

In the present high speed mode state, assuming that a torque to be transmitted from the engine to the input shaft 29 is expressed as $T_e$, a toque $T_{CVU}$ passing through the toroidal-type continuously variable transmission 12a can be expressed by the following numeric equation (4). The meanings of marks used in this equation are as described previously. Also, the value of the transmission ratio $e_{CVU}$ of the toroidal-type continuously variable transmission 12a, in this numeric equation (4), provides a negative value.

[Numeric Equation 4]

$$T_{CVU} = \frac{1}{\left(1 - \frac{(1+i_2)R_{OPG}}{(R_{IPG} \cdot R_{CG1} \cdot R_{CG2} \cdot e_{CVU})}\right)} T_e \qquad (4)$$

As can be clearly seen from the above numeric equation (4), according to the above high speed mode state, there can be always obtained the relationship such that $T_{CVU} < T_e$. This means that, in the high speed mode state, the toque $T_{CVU}$ passing through the toroidal-type continuously variable transmission 12a is reduced, so that both of the transmission efficiency and durability of the toroidal-type continuously variable transmission 12a can be thereby enhanced.

Also, as can be seen clearly from the above-mentioned equation (3) and the previously-described equation (1), in case where the reduction ratios of the transmission parts respectively formed by the gears 51, 52 and gears 54, 55 are expressed as $R_{CG1}$, $R_{CG2}$, and proper values larger than 1 are employed for them, there exists such speed ratio $e_{CVU}$ of the toroidal-type continuously variable transmission 12a that allows the speed ratio $e_{CVT}$ of the whole of the continuously variable transmission apparatus in the low speed mode state expressed by the above-mentioned numeric equation (1) to coincide with the speed ratio $e_{CVT}$ thereof in the high speed mode state expressed by the above-mentioned numeric equation (3). The low speed mode and high speed mode, in this manner, are allowed to switch over to each other in a state where their speed ratios $e_{CVT}$ respectively expressed by the two numeric equations (1) and (3) coincide with each other. That is, in case where the transmission ratio $e_{CVU}$ of the toroidal-type continuously variable transmission 12a provides a proper value which can coincide the two speed ratios respectively expressed by the two numeric equations (1) and (3) with each other, the low- and high-speed clutches 27a and 28a are to be connected or disconnected.

Figure 2:
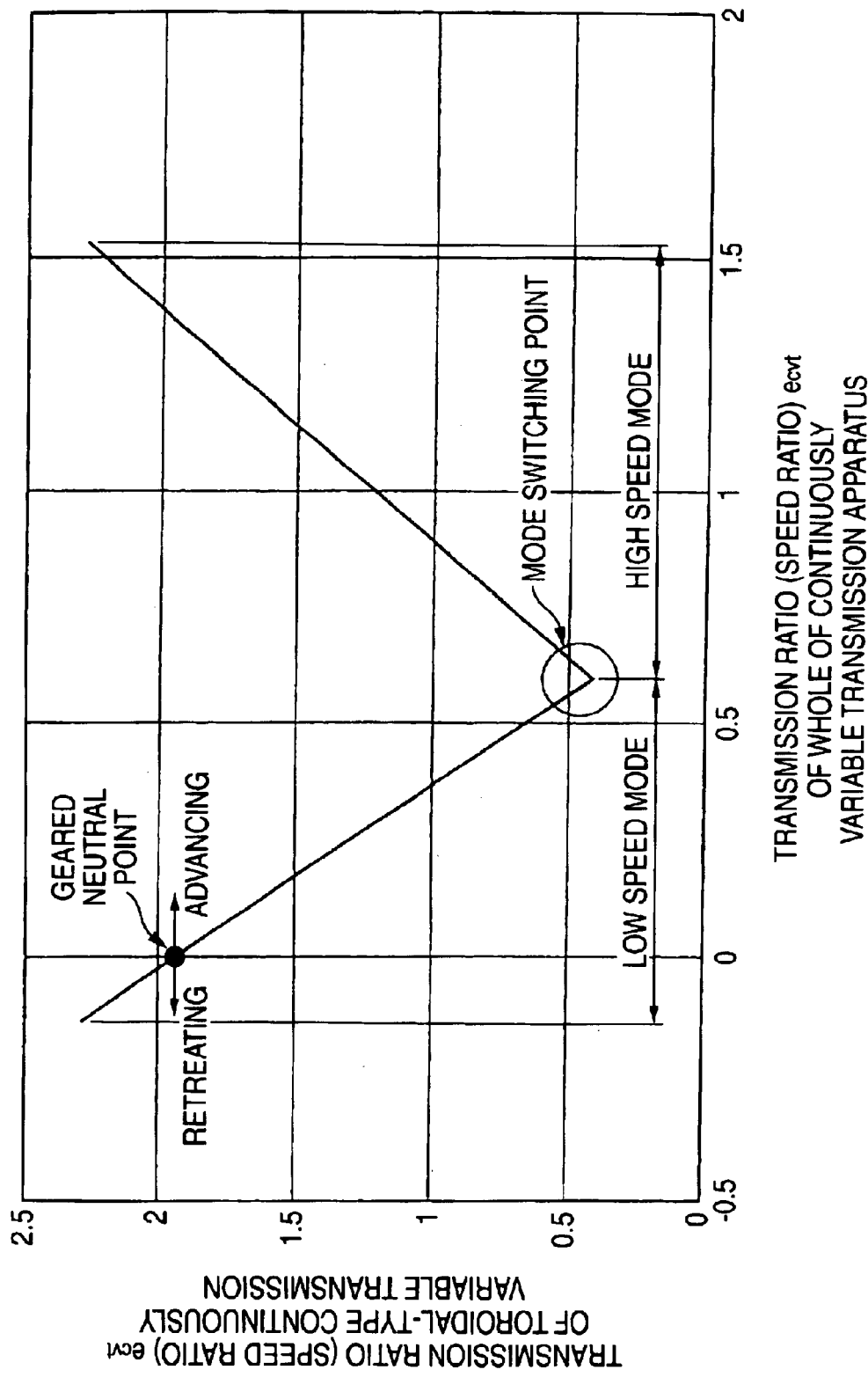
FIG. 2 is a diagrammatic view of the relationship between the transmission ratio of a toroidal-type continuously variable transmission and the speed ratio of the whole of the continuously variable transmission apparatus incorporating the toroidal-type continuously variable transmission therein.
Figure 3:
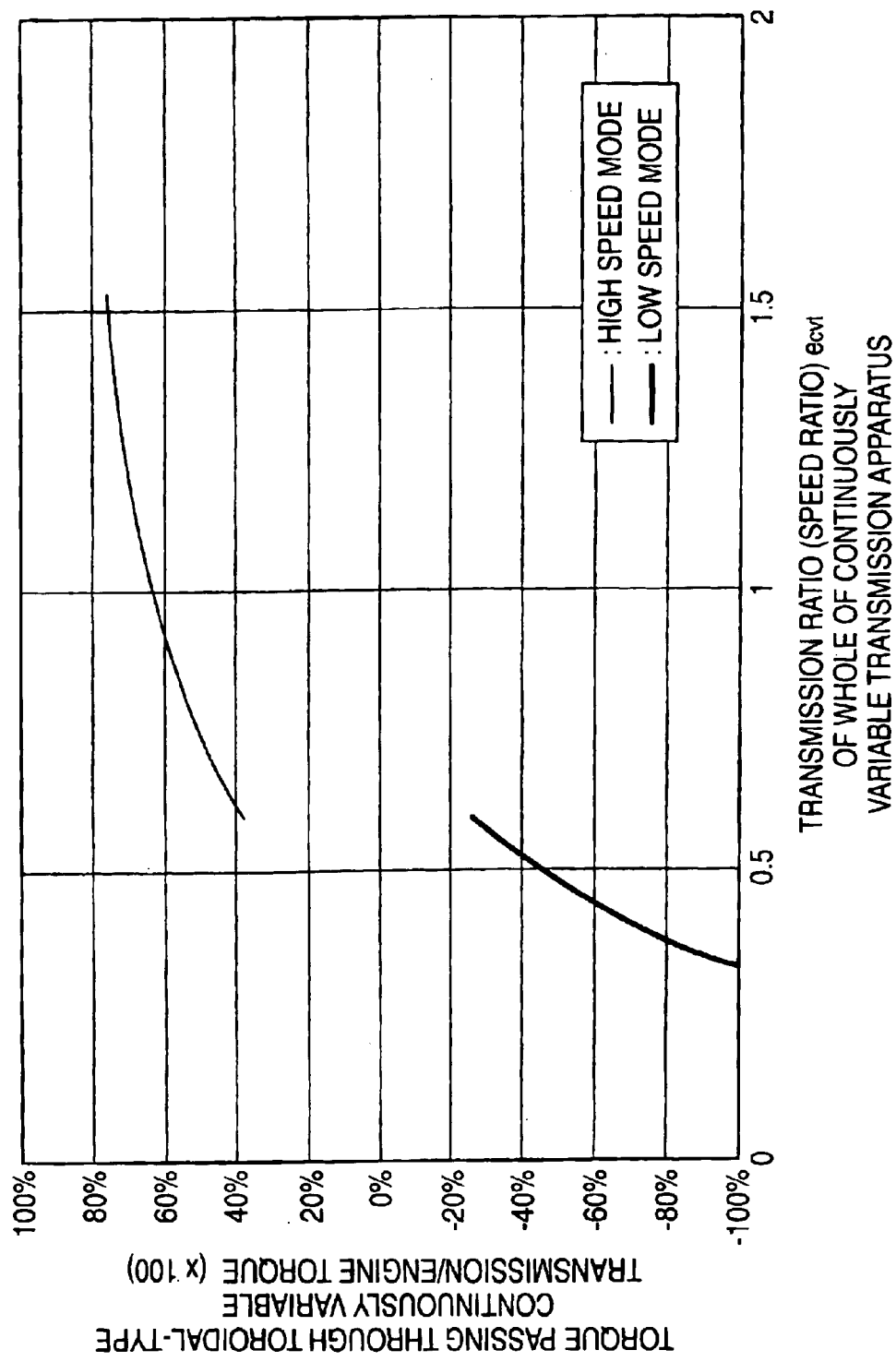
FIG. 3 is a diagrammatic view of the relationship between the size and direction of a toque passing through the toroidal-type continuously variable transmission and the speed ratio of the whole of the continuously variable transmission apparatus incorporating the toroidal-type continuously variable transmission therein.

Now, FIGS. 2 and 3 respectively show the characteristics of the above-mentioned continuously variable transmission apparatus in case where the transmission ratio $e_{CVU}$ of the toroidal-type continuously variable transmission 12a is set for a value in the range of -0.435~-2.3, $i_1$ is set for 2.3, $i_2$ is set for 2.6, $R_{OPG}$ is set for 0.769, $R_{IPG}$ is set for 0.909, and $R_{CG1}$ and $R_{CG2}$ are respectively set for 2. Of these two figures, FIG. 2 shows the relationship between the transmission ratio $e_{CVU}$ of the toroidal-type continuously variable transmission 12a and the speed ratio $e_{CVT}$ of the whole of the continuously variable transmission apparatus incorporating the toroidal-type continuously variable transmission 12a therein. And, FIG. 3 shows the relationship between the size and direction of the torque passing through the toroidal-type continuously variable transmission 12a and the speed ratio $e_{CVT}$ of the whole of the continuously variable transmission apparatus incorporating the toroidal-type continuously variable transmission 12a therein.

Of these two figures, FIG. 2 shows that, in the case of the continuously variable transmission apparatus according to the present embodiment, in case where the transmission ratio $e_{CVU}$ of the toroidal-type continuously variable transmission 12a is set for a value of the order of 1.95, the output shaft 34 can be stopped while leaving the input shaft 29 rotating. Also, FIG. 2 further shows that, in case where the transmission ratio $e_{CVU}$ of the toroidal-type continuously variable transmission 12a is set for a value of the order of 0.4 as well as the low- and high-speed clutches 27a and 28a are connected and disconnected, between the low and high speed modes, there can be realized a smooth gear-change state without causing the speed ratio $e_{CVT}$ to be discontinuous. Further, FIG. 3 shows that, substantially over the entire area in the advancing state, the toque $T_{CVU}$ passing through the toroidal-type continuously variable transmission 12a can be reduced down to a low level, thereby being to enhance both of the transmission efficiency and durability of the toroidal-type continuously variable transmission 12a.

The present invention is explained in reference to a half-toroidal-type continuously variable transmission. However, the present invention may have applicability to full-toroidal-type continuously variable transmission.

Since the present invention has the above-mentioned structure and operation, there can be realized a continuously variable transmission apparatus which is small in the axial direction thereof, is large in the transmission ratio width thereof, and can eliminate the need for provision of a start device. Therefore, the present invention can contribute toward enhancing the practical use thereof as a transmission for a small-sized car such as an FF car.

What is claimed is:

1. A continuously variable transmission apparatus, comprising:

an input shaft;

a toroidal-type continuously variable transmission disposed concentrically with the input shaft;

a first rotation transmission shaft disposed in parallel to the input shaft;

a first planetary-gear-type transmission disposed on the periphery of the first rotation transmission shaft so as to be concentric with each other, the first planetary-gear-type transmission including a first ring gear;

a second planetary-gear-type transmission disposed on the periphery of the first rotation transmission shaft so as to be concentric with each other, the second planetary-gear-type transmission including a second carrier;

a second rotation transmission shaft disposed in parallel to the input shaft and the first rotation transmission shaft;

an output shaft disposed concentrically with the first rotation transmission shaft;

a first power transmission mechanism for transmitting the rotation of the input shaft to the first ring gear of the first planetary-gear-type transmission;

a second power transmission mechanism for transmitting the rotation of the input shaft through the second rotation transmission shaft to the second carrier of the second planetary-gear-type transmission; and, a switching mechanism for switching power transmission states between the input shaft and the output shaft through the first and second power transmission mechanisms over to each other, wherein, in a state where the power transmission through the first power transmission mechanism is allowed and the power transmission through the second power transmission mechanism is cut off, in accordance with the control of the transmission ratio of the toroidal-type continuously variable transmission, the output shaft be stopped while leaving the input shaft rotating.

2. A continuously variable transmission apparatus as set forth in claim 1, wherein the first and second planetary-gear-type transmissions are respectively of a single pinion type, the toroidal-type continuously variable transmission comprises;
an input side disk rotatable together with the input shaft;
an output side disk supported so as to be concentric with the input side disk and rotated with respect to the input side disk;
a plurality of power rollers respectively interposed between the input side disk and the output side disk; and
a third power transmission mechanism for allowing the output side disk to drive and rotate the first rotation transmission shaft, the first planetary-gear-type transmission comprises;
a first sun gear rotatable together with the first rotation transmission shaft;
the first ring gear being rotatably supported on the periphery of the first sun gea;
a first carrier supported so as to be concentric with the first sun gear and the first ring gear and can be rotated with respect to the first sun gear and the first ring gear; and,
a plurality of first planetary gears meshingly engaged with the first sun gear and the first ring gear while they are respectively rotatably supported on the first carrier, the second planetary-gear-type transmission comprises:
a second sun gear rotatable together with the first rotation transmission shaft;
a second ring gear rotatably supported on the periphery of the second sun gear and rotatable together with the first carrier;
the second carrier being supported so as to be concentric with the second sun gear and the second ring gear and rotated with respect to the second sun gear and the second ring gear; and,
a plurality of second planetary gears meshingly engaged with the second sun gear and the second ring gear while they are respectively rotatably supported on the second carrier, and the first power transmission mechanism is used to transmit the rotation of the input shaft to the first ring gear, the second power transmission mechanism is used to transmit the rotation of the input shaft through the second rotation transmission shaft to the second carrier, and the switching mechanism allows execution of the power transmission through one of the first and second power transmission mechanisms and cuts off the power transmission through the other power transmission mechanism, in a state where the switching mechanism allows execution of the power transmission through the first power transmission mechanism and cuts off the power transmission through the second power transmission mechanism, in accordance with the control of the transmission ratio of the toroidal-type continuously variable transmission, the output shaft is stopped while leaving the input shaft rotating.

3. A continuously variable transmission apparatus as set forth in claim 2, wherein the switching mechanism comprise a low-speed clutch to be connected when realizing a low speed mode for stopping the output shaft while the input shaft is left rotating, and a high-speed clutch to be connected when realizing a high speed mode usable only in the advancing state; and also wherein the low-speed clutch is disposed in series in an intermediate portion of the first power transmission mechanism, and the high-speed clutch is disposed in series in an intermediate portion of the second power transmission mechanism.

4. A continuously variable transmission apparatus as set forth in claim 2, wherein, in case where the reduction ratio of the first power transmission mechanism from the input shaft to the first ring gear is expressed as $R_{IPG}$, the reduction ratio of the third power transmission mechanism from the output side disk to the first sun gear is expressed as $R_{OPG}$, and the ratio of the teeth number of the first ring gear with respect to that of the first sun gear is expressed as $i_1$, $(R_{OPG}/R_{IPG}) \cdot i_1$ is the transmission ratio that is realized by the toroidal-type continuously variable transmission.

5. A continuously variable transmission apparatus as set forth in claim 4, wherein the reduction ratio of the second power transmission mechanism from the input shaft to the second carrier is larger than the reduction ratio of the first power transmission mechanism from the input shaft to the first ring gear.

6. A continuously variable transmission apparatus as set forth in claim 4, wherein there is satisfied the relationship, that is, $0.4<(R_{OPG}/R_{IPG}) \cdot i_1<5$.

* * * * *